United States Patent [19]

Tsukamoto et al.

[11] 4,039,110
[45] Aug. 2, 1977

[54] TAPE HIGH-SPEED TRAVELLING DEVICE

[75] Inventors: Hiroyuki Tsukamoto, Kawasaki; Morio Akino, Fujisawa, both of Japan

[73] Assignee: Tokyo Shibaura Electric Co., Ltd., Kawasaki, Japan

[21] Appl. No.: 576,808

[22] Filed: May 12, 1975

[30] Foreign Application Priority Data

May 21, 1974 Japan .................. 49-56130

[51] Int. Cl.$^2$ .......................................... B65H 17/22
[52] U.S. Cl. ............................... 226/177; 226/187
[58] Field of Search ............... 226/176, 177, 187, 181, 226/186, 180, 194

[56] References Cited

U.S. PATENT DOCUMENTS

| 1,135,239 | 4/1915 | Wilcox | 226/177 |
|---|---|---|---|
| 1,185,260 | 5/1916 | Stine | 226/177 |
| 2,418,545 | 4/1947 | Zimmerman | 226/176 X |
| 2,913,192 | 11/1959 | Mullin | 226/176 X |
| 2,990,092 | 6/1961 | Begun | 226/176 |
| 3,158,305 | 11/1964 | Trimble | 226/177 UX |
| 3,257,056 | 6/1966 | Cederberg | 226/176 |
| 3,370,803 | 2/1968 | Newell | 226/176 X |
| 3,372,850 | 3/1968 | Hipelius | 226/187 X |
| 3,471,072 | 10/1969 | Bolick | 226/187 |

Primary Examiner—Richard A. Schacher
Attorney, Agent, or Firm—Oblon, Fisher, Spivak, McClelland & Maier

[57] ABSTRACT

A tape high-speed travelling device comprises a pinch roller allowing a tape to travel at a speed of more than 5m/sec. by elastically pressing the tape against a capstan, a device for moving the pinch roller toward the capstan, and a stop for limiting the movement of the pinch roller toward the capstan to a prescribed range to prevent occurrence of vibrations such as forced vibrations due to the rotation of the pinch roller.

4 Claims, 6 Drawing Figures

TAPE HIGH-SPEED TRAVELLING DEVICE

This invention relates to a tape-high-speed travelling device used to record and/or reproduce a video signal, for example.

As a video signal recording and reproducing device, i.e., a video tape recorder (which is hereinafter referred to as "VTR") there is generally put to practical use a rotary head type VTR wherein a magnetic tape is scanned by rotating a magnetic head. Since, in this rotary head type VTR, recording or reproducing is carried out utilizing the relative movement between the magnetic tape and the rotary head, a servo-mechanism for controlling the mutual positional relationship therebetween is required and has the drawback that it is made complicated in construction and costly. In recent years, a stationary head type VTR requiring no such servo-mechanism has started to be put to practical use. In this type of VTR, a track extending along the longitudinal direction of the magnetic tape is scanned by a stationary or non-rotational magnetic head. This stationary head type VTR, however, has the drawback that the magnetic tape has to be allowed to travel at an extremely high speed or for example, 5m/sec. or more; the tape length therefore has to be made large where it is desired to obtain a prescribed length of recording time; and as a result the tape travel becomes unstable to cause a jitter to be produced in a reproduced picture. Accordingly, difficulties are presented in putting this type of VTR to practical use.

The object of the invention is to provide a tape-high-speed travelling device such as a stationary head type VTR which is capable of allowing the tape to stably travel to reduce the occurrence of wows and flutters, and therefore being put to practical use. There can be contemplated a variety of causes for wows and flutters occurring when the tape is allowed to travel at a high speed of 5m/sec. or more. According to the present inventors' experiments it has been found that a pinch roller pressed through the tape against a capstan makes a forced vibration during the tape travel; and this forced vibration constitutes a factor for the irregularity of tape travelling speed. Generally, at least the outer periheral portion of the pinch roller is formed of elastic material such as rubber, and the pinch roller is pressed through the magnetic tape against the capstan owing to the action of a spring, and the capstan is rotated by a drive means such as a motor, whereby the tape travel is performed. As a result, the pinch roller is brought to its own elastic force and the elastic force of the spring, and therefore caused to make an irregular forced vibration. As a result, the tape allowed to travel in abutment with the pinch roller is also caused to make an irregular vibration. To remove these drawbacks, the tape-high speed travelling device of the invention is so designed as to prevent occurrence of such irregular free vibration such as a forced vibration by providing a stop for limiting to a prescribed range the movement by the spring of the pinch roller toward the capstan.

This invention can be more fully understood from the following detailed description when taken in conjunction with the accompanying drawings, in which.

There will now be described a tape-high-speed travelling device according to the embodiment of the invention in connection with a stationary head type VTR for recording and/or reproducing a video signal, with reference to the appended drawings.

Figure 1:
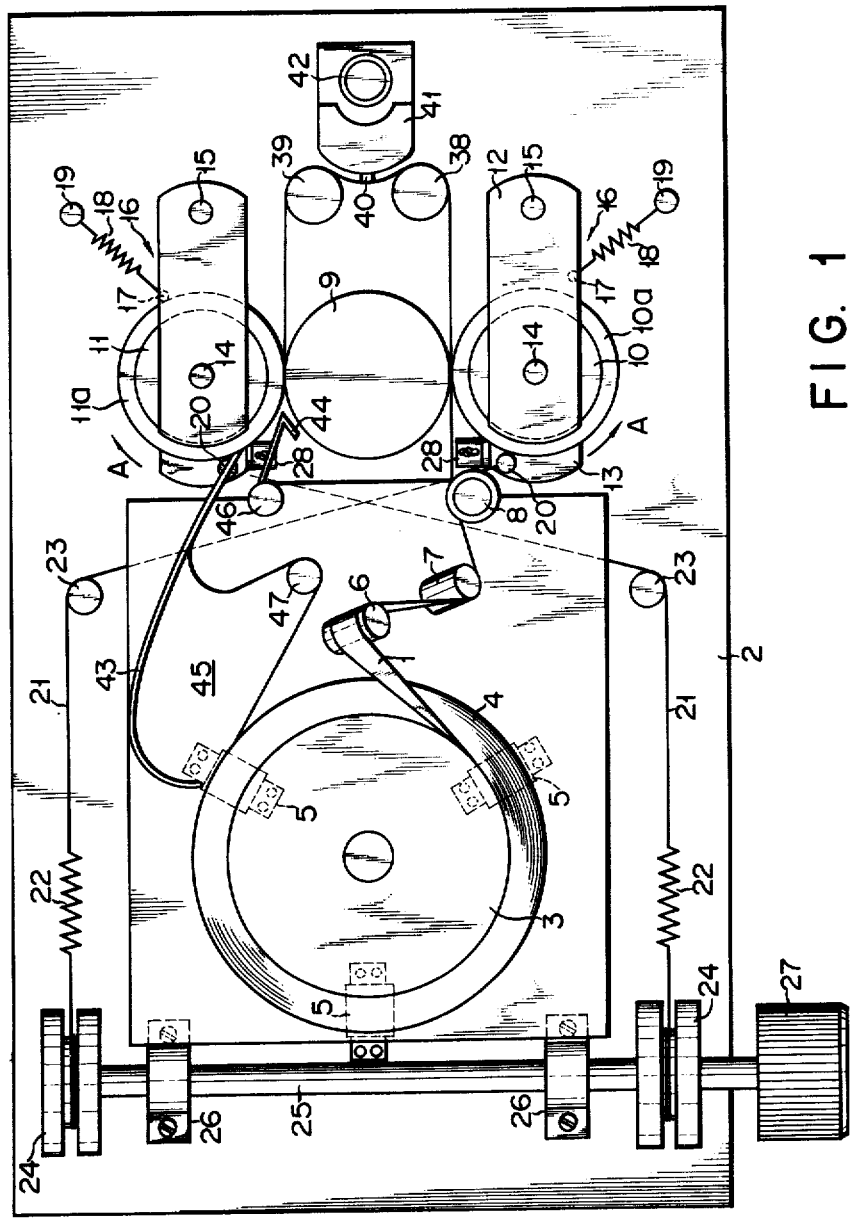
FIG. 1 is a plan view of a tape-high speed travelling device according to an embodiment of the invention.
Figure 2:
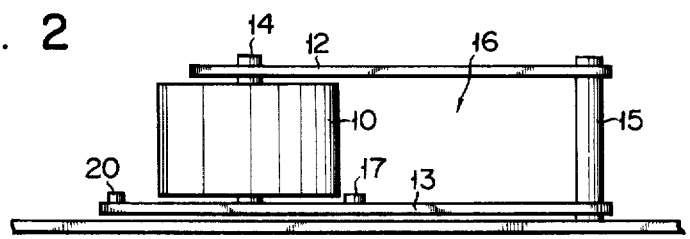
FIG. 2 is an enlarged side view of the pinch roller and its support mechanism of the device shown in FIG. 1.

In FIG. 1, a reel 3 is rotatably mounted on a substrate 2 and is wound with an endless magnetic tape 1 in such a manner that the tape 1 is drawn out from the innermost periphery of a tape roll 4 and taken up from the outermost periphery thereof. The underside of the tape roll 4 about the reel 3 is in abutment with three rubber rollers 5 (indicated by broken lines) rotatably supported on the substrate 2 and radially disposed at prescribed angles with respect to each other. As a result, when the tape 1 is allowed to travel, the tape roll 4 is rotated together with the reel 3 and, in accordance with the tape roll rotation, the rubber rollers 5 are also rotated about their axes.

In the neighborhood of the reel 3, first and second poles 6, 7 are erected obliquely to the substrate 2, and the tape 1 drawn out from the innermost periphery of the tape roll 4 is guided by the poles 6, 7 so as to travel perpendicularly to the substrate 2. Down-stream of the second pole 7 there is erected at right angles to the substrate 2 a third pole 8 having flanges at both the upper and lower ends and adapted to regulate the width directional vibration of the tape by allowing the tape to pass between the flanges. On the substrate 2 there is rotatably supported a stainless steel capstan 9 connected directly to a rotary shaft of a motor, not shown, provided below the substrate 2, so as to provide a high speed rotation. On opposite sides of the capstan 9 there are provided a pair of pinch rollers 10, 11, whose outer peripheral portions 10a, 11a are each formed of elastic material such as natural rubber or synthetic rubber and whose diameters are not largely different from the capstan diameter. The pinch rollers 10, 11 are rotatably fitted to shafts 14 each fixed between free end portions of a pair of support plates 12, 13 provided, respectively, above and below each of the pinch rollers 10, 11 in parallel with each other. Base end portions of the respective pairs of support plates 12, 13 are pivotally supported by rocking shafts 15 on the substrate 2. As a result, pinch roller support mechanisms 16 each composed of the pair of support plates 12, 13 and the shaft 14 are supported on the substrate 2 so as to be rocked about the rocking shafts 15 in parallel with the upper surface of the substrate 2. The base end portions of the pinch roller support mechanisms 16 are connected respectively by pins 17 to one end of tension springs 18, the other ends of which are fixed respectively to the substrate 2 by pins 19. As a result, there is imparted to the support mechanism 16 a rocking force acting in a direction indicated by an arrow A in FIG. 1, or in a direction in which the pinch rollers 10, 11 go away from the capstan 9. The free end portions of the pinch roller support mechanisms 16 are connected respectively through pins 20 to one end of a pair of tension wires 21 formed medially with tension springs 22. These tension wires 21 are guided along both side edges of the substrate by pins 23 provided respectively in the vicinity of the both side edges of the substrate 2. The other ends of the tension wires 21 are taken up respectively by a pair of take-up wheels 24. The take-up wheels 24 are fitted to a rotary shaft 25 so as to be rotated jointly therewith. The shaft 25 is disposed rotatably with respect to the substrate through means of bearings 26 disposed on the substrate 2, and a knob 27 is provided on an extended end of the shaft 25. As a result, when this knob 27 is rotated clockwise, the tension wire 21 is loosened so as to cause the pinch roller support mechanism 16 to be rocked in the indicated direction A by the tension spring 18, so that the pinch rollers 10, 11 are apart from the capstan 9 to facilitate the insertion of the tape into the interspace between each pinch roller and the capstan. Conversely, when the knob 27 is rocked counterclockwise, the tension wire 21 is pulled toward the left so as to cause the pinch roller support mechanism 16 to be rocked in the opposite direction to the indicated direction A against the tension force of the tension spring 18, so that the pinch rollers 10, 11 respectively press the tape against the capstan to cause the tape 1 to be ready for travel. The above-mentioned rotary shaft 25 is provided with an appropriate rotation restricting means, which for example, increases the friction between the bearing 26 and the shaft 25 or additionally provides an engagement means with the shaft 25, so as to be prevented from being rotated with respect to the bearing 26 due to the pulling force of the tension spring 22. Alternatively, the rotary shaft 25 or take-up wheel 24 may of course be provided with a suitable braking mechanism.

Figure 3:
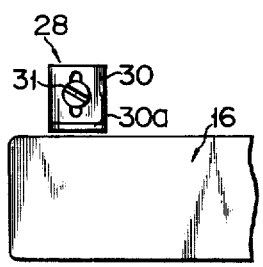
FIG. 3 is an enlarged plan view of the stop of the device shown in FIG. 1.

Near the pitch roller support mechanisms 16 of the substrate 2 are provided a pair of regulators or stops 28 for regulating the elastic capstan pressing force of the pinch rollers 10, 11. The stop 28 is provided for the purpose of controlling the movement of the pinch roller toward the capstan so that when the support mechanism 16 is compulsorily rocked and urged toward the capstan 9 by the wire 21 having the tension spring 22 to cause the pinch rollers 10, 11 to be elastically pressed against the capstan 9 through means of the tape 1, this elastic pressing force can be prevented from exceeding a prescribed value. In this preferred embodiment, the stop 28 is designed to achieve the above object by preventing the support mechanism 16 from being rocked toward the capstan any farther than a prescribed extent. As shown enlarged in FIG. 3, the stop 28 comprises a supporting plate 30 having at one end an upwardly extended stop portion 30a and an adjustment screw 31 for securing the supporting plate 30 to the substrate 2 as a result of being fitted by screw engagement to the substrate 2 via a slot in the plate 30. When the screw 31 is loosened, the supporting plate 30 is rendered slidable with respect to the substrate 2 so as to adjust the position of the stop portion 30a. When the screw 31 is tightened, the supporting plate 30 can be secured to the substrate 2. As a result, the supporting plate 30 is fixed at a given position by adjusting the tightness of the screw 31, so as to render it possible to adjust the degree of regulation effected by abutment of the extended portion 30a against the support mechanism 16, or the degree of rocking movement of the pinch rollers 10, 11, or the elastic pressing force of the pinch rollers which acts on the capstan.

Figure 4:
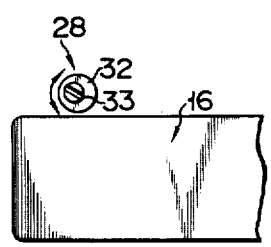
FIGS. 4 and 5 are enlarged plan and side views, respectively, of different modifications of the stop.

A modified regulator or stop 28 shown in FIG. 4 comprises a disc plate 32 having a through hole at an eccentric position and an adjustment screw 33 for fixing the disc plate 32 to the substrate 2 via the through hole, whereby the above mentioned degree of regulation can be adjusted by fixing the disc plate 32 to the substrate 2 after rotation of the disc plate 32 through a given angle.

Figure 5:
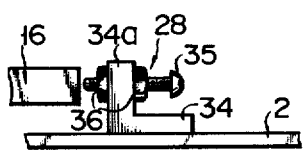

A modified regulator or stop 28 shown in FIG. 5 comprises a support plate 34 having a vertically extended portion 34a and being fixed to the substrate 2, an adjustment screw 35 inserted into a through hole formed in the extended portion 34a of the support plate 34 in such a manner that its tip end is situated on the pinch roller support mechanism side, and a pair of nuts 36 engaged with the adjustment screw 35 to sandwich the extended portion 34a therebetween. In this stop 28, adjustment is performed by rotating the screw 35 so that its tip end may abut against the support mechanism 16 at a given position.

Referring to FIG. 1, a pair of guides poles 38, 39 are erected ahead of the capstan 9 on the substrate 2 at a prescribed distance from each other in a manner situated on opposite sides of a magnetic head 40, said magnetic head 40 being so provided as to slightly protrude into the space defined between said pair of guide poles 38, 39. The magnetic head 40 is fixed to a head fixing base 41 which is supported by a screw mechanism 42. As a result, the magnetic head 40 can be displaced by the screw mechanism 42 through the head fixing base 41 in a vertical direction, or in the width direction of the tape 1, and therefore even where the tape is formed with a plurality of tracks, the magnetic head 40 can scan all of the tracks. The pair of guide poles 38, 39 may be movably provided so as to vary the intervals between the magnetic head 40 and the guide poles 38, 39, which offers an advantage of facilitating the tape insertion.

The tape subjected to a recording or reproducing action due to the magnetic head 40 by passing between the capstan 9 and the inlet pinch roller 10 and then passing between the magnetic head 40 and each of the guide poles 38, 39 is passed between the capstan 9 and the outlet pinch roller 11 and is then taken up onto the tape roll 4 from the outer peripheral side thereof. According to this embodiment, in advance of being taken up, the tape delivered from the outlet pinch roller 11 is conducted into a tape slacking means 45 comprised of guide plates 43, 44, and is loosened within said slacking means, and is then fed toward the reel 3 while being guided by guide poles 46, 47.

In the tape-high-speed travelling device having the foregoing construction, the magnetic tape 1 is allowed to travel at a speed of 5m/sec to approximately 10m/sec through the rotation of the capstan 9. Under the tape-high-speed travelling condition, the pinch rollers 10, 11 are kept stable owing to the actions of the tension spring 18, 22 and stop 28 to prevent the tape from being redundantly vibrated.

Figure 6:
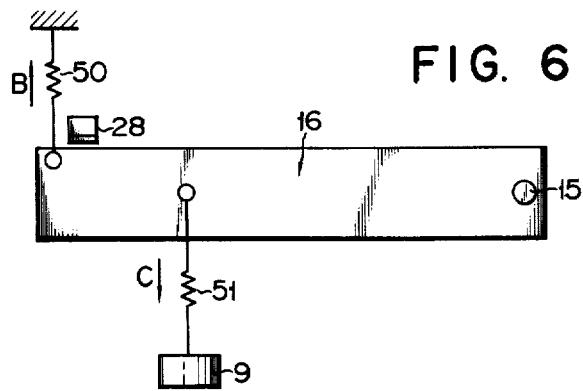
FIG. 6 is a view for explaining the effect obtained by the tape-high speed travelling device according to the invention.

Hereinafter, the reason why the above tape vibration is prevented will be explained referring to FIG. 6. The pinch roller, and thus the pinch roller support mechanism 16, is dynamically supported in such a relation as shown in FIG. 6. In FIG. 6, a reference numeral 50 designates a tension means comprising the wire 21 having the tension spring 22, said tension means urging the support mechanism 16 in a B-indicated direction. A reference numeral 51 denotes a tension means whose tensile force is equivalent to an elastic force acting on the pinch roller when the elastic material constituting the outer peripheral portion of the pinch roller has been brought into abutment with the capstan, said tension means urging the support mechanism 16 in a C-indicated direction. At the time of the tape travel, unless the stop 28 is provided, the support mechanism 16 will vibrate due to the elastic forces which act in mutually opposite directions with respect to the rocking shaft 15. However, where the stop 28 is provided as shown in FIG. 6 to thereby limit the B-directional rocking movement of the support mechanism 16 to a prescribed value or less, the forced vibration of the support mechanism 16, and thus of the pinch roller, is broadly restricted with the result that the tape vibration can also be prevented.

The tape-high-speed travelling device according to the invention has enabled an almost complete removal of the flutter component of approximately 100 Hz and its integral multiple which corresponds to the tape travel irregularity due to the pinch roller vibration. The frequency of said approximately 100 Hz and its integral multiple corresponds to a vibration peculiar to the pinch roller support mechanism or the harmonic wave component of this vibration. Furthermore, according to the present device, the capstan pressing force of the pinch roller is limited to a prescribed value or less. Therefore, the load applied to the motor for driving the capstan is reduced with the result that a motor whose output power is small can be employed as the driving source.

The preceding embodiment utilizes a tension spring as the means for biasing the pinch roller support mechanism, but this invention is not limited thereto and may utilize other means for elastically pressing the support mechanism, such as a compression spring, leaf spring or the like.

The pinch roller stop is not limited in terms of its construction and its attachment position it only being required to impose a limitation upon the movement of the pinch roller toward the capstan side.

In the device of the present invention, a reel for a tape may be of a cassette type, instead of a reel mounted on a substrate.

What we claim is:
1. A tape high-speed travelling device comprising: a substrate on which a reel wound with a tape is mounted,
a capstan rotatably provided on said substrate,
a pinch roller having an outer peripheral portion formed of elastic material and rotatably provided to face said capstan,
guide means for guiding said tape from said reel between said capstan and said pinch roller,
moving means for moving said pinch roller toward said capstan so as to allow it to elastically press said capstan through the tape, and
regulating means for stopping the movement of said moving means of said pinch roller toward said capstan at a predetermined point and to a prescribed extent so as to thereby limit the contact pressure between said pinch roller and said capstan and thereby prevent the occurrence of a forced vibration of said pinch roller,
wherein said moving means includes a pinch roller support mechanism rotatably supporting said pinch roller at one end and rockable with respect to said substrate by being pivotally supported at the other end, and a pulling member for pulling said one end of said support mechanism toward said capstan,
wherein said regulating means includes a stop provided on said substrate and regulating the movement of said pinch roller by abutting against said one end of said support mechanism,
wherein said stop includes a supporting plate having an extended portion abutting against said support mechanism and a slot, and an adjustment screw fitted by screw engagement into said substrate through said slot to fix said supporting plate.

2. A tape high-speed travelling device comprising:
a substrate on which a reel wound with a tape is mounted,
a capstan rotatably provided on said substrate,
a pinch roller having an outer peripheral portion formed of elastic material and rotatably provided to face said capstan,
guide means for guiding said tape from said reel between said capstan and said pinch roller,
moving means for moving said pinch roller toward said capstan so as to allow it to elastically press said capstan through the tape, and
regulating means for stopping the movement of said moving means of said pinch roller toward said capstan at a predetermined point and to a prescribed extent so as to thereby limit the contact pressure between said pinch roller and said capstan and thereby prevent the occurrence of a forced vibration of said pinch roller,
wherein said moving means includes a pinch roller support mechanism rotatably supporting said pinch roller at one end and rockable with respect to said substrate by being pivotally supported at the other end, and a pulling member for pulling said one end of said support mechanism toward said capstan,
wherein said regulating means includes a stop provided on said substrate and regulating the movement of said pinch roller by abutting against said one end of said support mechanism, and
wherein said stop includes a disc plate abutting against said support mechanism and having a through hole at its eccentric position, and an adjustment screw fitted by screw engagement into said substrate via said through hole to fix said disc plate.

3. A tape high-speed travelling device comprising:
a substrate on which a reel wound with a tape is mounted,
a capstan rotatably provided on said substrate,
a pinch roller having an outer peripheral portion formed of elastic material and rotatably provided to face said capstan,
guide means for guiding said tape from said reel between said capstan and said pinch roller,
moving means for moving said pinch roller toward said capstan so as to allow it to elastically press said capstan through the tape, and
regulating means for stopping the movement of said moving means of said pinch roller toward said capstan at a predetermined point and to a prescribed extent so as to thereby limit the contact pressure between said pinch roller and said capstan and thereby prevent the occurrence of a forced vibration of said pinch roller,
wherein said moving means includes a pinch roller support mechanism rotatably supporting said pinch roller at one end and rockable with respect to said substrate by being pivotally supported at the other end, and a pulling member for pulling said one end of said support mechanism toward said capstan,
wherein said regulating means includes a stop provided on said substrate and regulating the movement of said pinch roller by abutting against said one end of said support mechanism, and wherein said stop includes a support plate provided with an extended portion having a through hole and fixed to said substrate, an adjustment screw penetrating through said through hole of said support plate and abutting against said support mechanism at its tip end, and a pair of nuts fitted by screw engagement over said adjustment screw in a manner sandwiching said extended portion.

4. A tape-high speed travelling device comprising:

a substrate on which a reel wound with a tape is mounted, a capstan rotatably provided on said substrate, a pinch roller having an outer peripheral portion formed of elastic material and rotatably provided to face said capstan:

guide means for guiding said tape from said reel between said capstan and said pinch roller, moving means for moving said pinch roller toward said capstan so as to allow it to elastically press said capstan through the tape, and regulating means for stopping the movement of said moving means of said pinch roller toward said capstan at a predetermined point and to a prescribed extent so as to thereby limit the contact pressure between said pinch roller and said capstan and thereby prevent the occurrence of a forced vibration of said pinch roller, wherein said moving means includes a pinch roller support mechanism rotatably supporting said pinch roller at one end and rockable with respect to said substrate by being pivotally supported at the other end, and a pulling member for pulling said one end of said support mechanism toward said capstan, wherein said pulling member has a spring member for urging said one end of said support mechanism toward said capstan and wherein said moving means further includes a spring member for urging said one end of said support mechanism in a direction in which it goes away from said capstan.

* * * * *